(12) United States Patent
Chandra et al.

(10) Patent No.: US 6,594,779 B1
(45) Date of Patent: Jul. 15, 2003

(54) METHOD, SYSTEM AND PROGRAM PRODUCTS FOR MANAGING THE CHECKPOINTING/RESTARTING OF RESOURCES OF A COMPUTING ENVIRONMENT

(75) Inventors: Tushar Deepak Chandra, New York, NY (US); Ahmed-Sameh Afif Fakhouri, New Rochelle, NY (US); Liana Liyow Fong, Irvington, NY (US); William Francis Jerome, Amawalk, NY (US); Srirama Mandyam Krishnakumar, Mount Kisco, NY (US); Vijay Krishnarao Naik, Yorktown Heights, NY (US); John Arthur Pershing, Jr., Buchanan, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/280,531

(22) Filed: Mar. 30, 1999

(51) Int. Cl.[7] .................................................. G06F 11/00
(52) U.S. Cl. ........................................................ 714/15
(58) Field of Search ............................ 714/15, 20, 13, 714/6

(56) References Cited

U.S. PATENT DOCUMENTS

| | | | | |
|---|---|---|---|---|
| 4,648,031 A | | 3/1987 | Jenner .......................... | 364/200 |
| 5,214,778 A | | 5/1993 | Glider et al. ................ | 395/575 |
| 5,319,774 A | | 6/1994 | Ainsworth et al. .......... | 395/575 |
| 5,845,292 A | * | 12/1998 | Bohannon et al. .......... | 707/200 |
| 5,884,021 A | * | 3/1999 | Hirayama et al. ............ | 714/13 |
| 6,026,499 A | * | 2/2000 | Shirakihara et al. ........ | 709/104 |
| 6,154,877 A | * | 11/2000 | Ramkumar et al. ......... | 717/114 |
| 6,289,474 B1 | * | 9/2001 | Beckerle ....................... | 714/13 |
| 6,330,689 B1 | * | 12/2001 | Jin et al. ...................... | 714/15 |
| 6,338,147 B1 | * | 1/2002 | Meth et al. .................. | 711/144 |
| 6,351,754 B1 | * | 2/2002 | Bridge et al. ................. | 714/16 |
| 6,360,331 B2 | * | 3/2002 | Vert et al. .................... | 709/239 |

OTHER PUBLICATIONS

Johny Sroui, Paul Schuster, Maury Bach and Yulik Kuzmin, "A Transparent Checkpoint Facility On NT", Proceeding of the 2nd USENIX Windows NT Symposium, Seattle, Washington, Aug. 3–4, 1998.

* cited by examiner

Primary Examiner—Robert Beausoliel
Assistant Examiner—Bryce P. Bonzo
(74) Attorney, Agent, or Firm—Kevin M. Jordan, Esq.; Douglas W. Cameron, Esq.; Heslin Rothenberg Farley & Mesiti P.C.

(57) ABSTRACT

Resources are checkpointed in order to save the state of the resources. The resources can then be brought back to the same running state, during a restart procedure, by making use of the saved state. The determination of when to take a checkpoint or when to restart a resource is made by an entity, such as a cluster manager, external to the entity initiating or taking the checkpoint or performing the restart. The decision to checkpoint/restart a resource is provided by the cluster manager to a resource manager associated with the resource. This communication is facilitated by interfaces to the cluster manager provided by the resource manager.

69 Claims, 7 Drawing Sheets

METHOD, SYSTEM AND PROGRAM PRODUCTS FOR MANAGING THE CHECKPOINTING/RESTARTING OF RESOURCES OF A COMPUTING ENVIRONMENT

TECHNICAL FIELD

This invention relates, in general, to managing resources of a computing environment, and in particular, to managing the checkpointing/restarting of the resources of the computing environment.

BACKGROUND ART

The ability to recover from failures within a computing environment is of paramount importance to the users of that environment. Thus, steps have been taken to facilitate the recovery from failures.

One technique currently provided to facilitate the recovery from failures is to periodically take checkpoints of the resources of the computing environment. In particular, at certain times, each resource saves the current state of the resource, in the event that the state is needed to recover from a failure. The manner in which the checkpoint is taken by the resource is resource specific.

Thereafter, if a failure occurs requiring one or more resources to be restarted, the restarted resources bring themselves back to the state they were in when the checkpoints were taken. This provides a mechanism to recover from failures.

Although some recovery mechanisms exist today, a need still exists for mechanisms that improve the management of resources within the computing environment. In particular, a need exists for a capability that better manages the checkpointing and restarting of resources.

A further need exists for a capability that separates the decision to checkpoint/restart from the initiating and/or performing of the checkpoint/restart. Further, a need exists for a checkpoint/restart capability that is suitable for distributed environments, including heterogeneous environments.

A yet further need exists for a capability that cleans up checkpoint information that is no longer desired.

SUMMARY OF THE INVENTION

The shortcomings of the prior art are overcome and additional advantages are provided through the provision of a method of managing the checkpointing of resources of a computing environment. The method includes, for instance, determining, by a first entity of the computer environment, that a checkpoint of a resource of the computing environment is to be taken; and initiating the taking of the checkpoint of the resource by a second entity of the computing environment.

In one embodiment, the first entity has no knowledge of implementation details associated with the initiating the taking of the checkpoint.

In a further embodiment, the second entity is informed of the determination to checkpoint the resource by the first entity invoking an interface of the second entity indicative of the determination to take a checkpoint.

In a further embodiment, the checkpoint is used to restart the resource. As one example, the first entity makes the determination to restart the resource and forwards this determination to the second entity by invoking an interface of the second entity indicative of the determination to restart.

In another embodiment, a plurality of checkpoints of a plurality of resources is initiated by at least one second entity.

In one embodiment, at least one resource of the plurality of resources is executing on a computing node of the computing environment having a first operating system, and at least one other resource of the plurality of resources is executing on another computing node of the computing environment having a second operating system, which is different from the first operating system.

In another aspect of the present invention, a method of managing the restarting of resources of a computing environment is provided. The method includes, for instance, determining, by a first entity of the computing environment, that a resource of the computing environment is to be restarted; and initiating the restarting of the resource by a second entity of the computing environment.

In another aspect of the present invention, a system of managing the checkpointing of resources of a computing environment is provided. The system includes, for instance, a first entity of the computing environment adapted to determine that a checkpoint of a resource of the computing environment is to be taken; and a second entity of the computing environment adapted to initiate the taking of the checkpoint of the resource.

In a further aspect of the present invention, a system of managing the restarting of resources of a computing environment is provided. The system includes, for example, a first entity of the computing environment being adapted to determine that a resource of the computing environment is to be restarted; and a second entity of the computing environment being adapted to initiate the restarting of the resource.

In yet another aspect of the present invention, an article of manufacture including at least one computer usable medium having computer readable program code means embodied therein for causing the managing of the checkpointing of the resources of the computing environment is provided. The computer readable program code means in the article of manufacture includes, for instance, computer readable program code means for causing a computer to determine, by a first entity of the computing environment, that a checkpoint of a resource of a computing environment is to be taken; and computer readable program code means for causing a computer to initiate the taking of the checkpoint of the resource by a second entity of the computing environment.

In a further aspect of the present invention, at least one program storage device readable by a machine, tangibly embodying at least one program of instructions executable by the machine to perform a method of managing the restarting of resources of a computing environment is provided. The method includes, for example, determining, by a first entity of the computing environment, that a resource of the computing environment is to be restarted; and initiating the restarting of the resource by a second entity of the computing environment.

In accordance with the principles of the present invention, capabilities are provided for managing the checkpointing and restarting of resources of a computing environment, such as a homogeneous or heterogeneous distributed computing environment. Advantageously, an entity of the computing environment, other than the entity initiating or performing the checkpoint/restart, is responsible for determining when a checkpoint or restart is to be performed.

The entity making this determination (i.e., the determining entity) need not know how to initiate or perform the checkpoint/restart. The entity responsible for initiating the checkpoint/restart provides interfaces to the determining entity, which the determining entity uses to notify the initiating entity of when to proceed.

In addition to the above, a capability is advantageously provided to clean up old checkpoint information that is no longer desired. This cleanup is initiated by the determining entity.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with the principles of the present invention, a checkpoint capability is provided that enables an entity, other than the entity performing the checkpoint, to make the decision when to checkpoint. Similarly, a restart capability is provided that enables an entity, other than the entity performing the restart, to make the decision of when to restart.

In one embodiment of the present invention, a cluster manager determines when a checkpoint of a resource is to be taken. The decision to checkpoint is then forwarded to a resource manager, which initiates the checkpoint. The checkpoint is then performed by the resource itself. The cluster manager need not know the details of how to initiate or implement the checkpoint. Likewise, in one embodiment, it is the cluster manager that determines that a resource is to be restarted. The cluster manager forwards this information to a resource manager, which is responsible for initiating the restart process. The restart is then performed by the resource itself. Again, the cluster manager need not know the details of how to initiate or perform the restart. The details associated with initiating the checkpoint/restart of the resources is encapsulated by one or more resource managers that are responsible for the resources.

Figure 1:
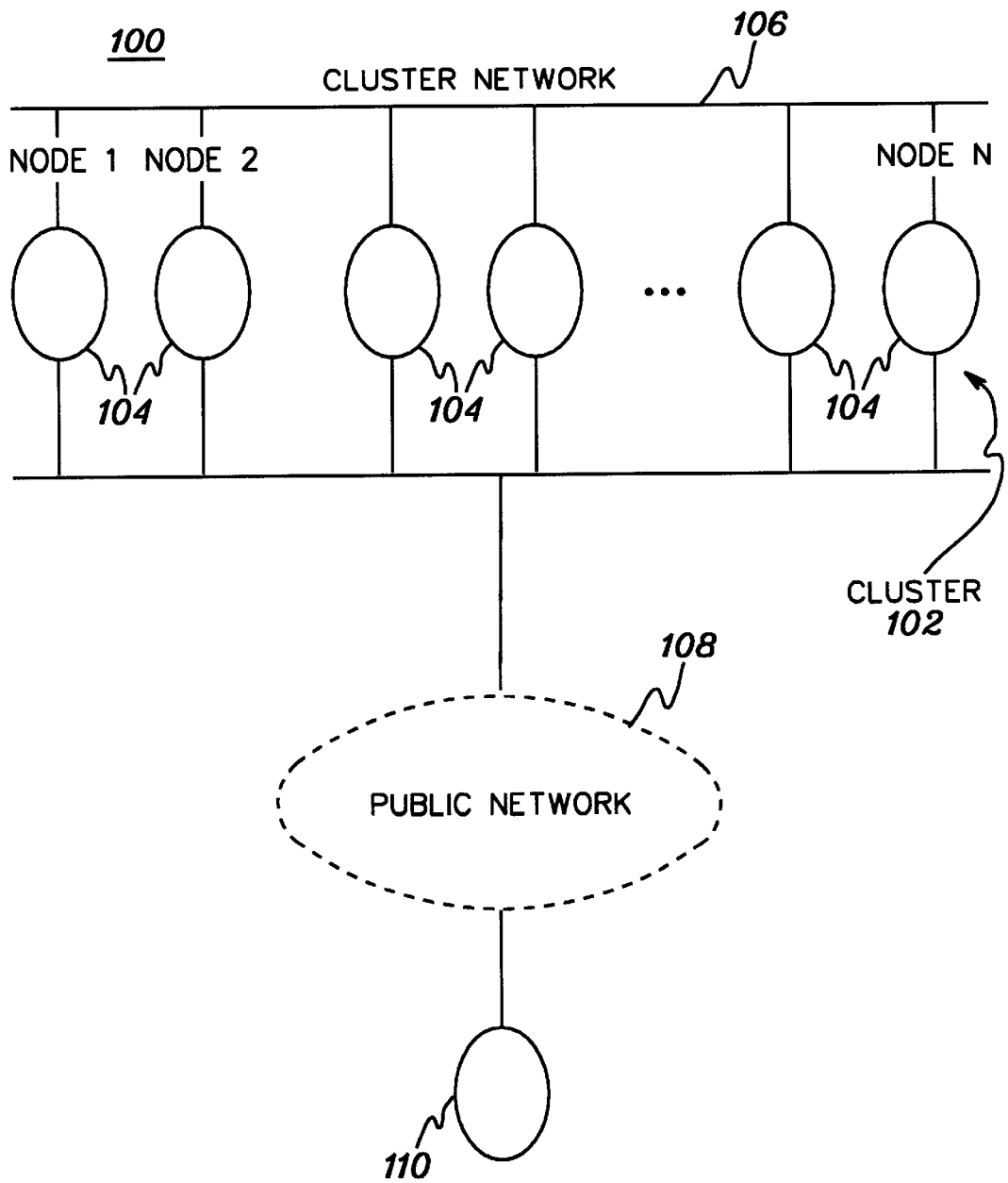
FIG. 1 depicts one example of a computing environment incorporating and using the capabilities of the present invention.

One embodiment of a computing environment incorporating and using the capabilities of the present invention is depicted in FIG. 1 In one example, computing environment 100 is a distributed computing environment having a cluster 102. Cluster 102 includes one or more computing nodes 104. Each computing node, is for instance, a UNIX workstation having at least one central processing unit, storage facilities and one or more input/output devices. Each central processing unit executes an operating system, such as AIX offered by International Business Machines Corporation.

Computing nodes 104 are coupled to one another by a cluster network 106, which is, for example, a high-speed local area network (LAN). One example of this type of LAN is the high-speed switch of the RE/6000 SP, offered by International Business Machines Corporation.

In this example, cluster 102 is coupled to a public network 108 to enable the cluster to provide services to one or more computing units 110 outside the cluster. Computing unit 110 is, for example, a UNIX workstation or any other type of computer or computing unit.

The computing environment described above is only one example of a computing environment incorporating and using the capabilities of the present invention. The capabilities of the present invention are equally applicable to various types of computing environments, including, but not limited to, homogeneous computing environments, heterogeneous computing environments, other types of distributed environments, and environments that do not include public networks. Further, the computing nodes may be other than UNIX workstations. They may be any other type of computers or computing units. Additionally, the operating system need not be AIX. Further, one or more of the computing nodes of the cluster may be different types of computing nodes than the others (e.g., different hardware) and/or run different types of operating systems. Likewise, the computing units may be the same or different from the computing nodes and may be the same or different from each other. The above described environment is offered as only one example.

The cluster is used to run, for instance, critical programs (applications) which require high availability. Examples of these applications include database servers, Enterprise Resource Planning (ERP) systems and web servers. These applications are referred to herein as resources, which run on the nodes in the cluster. These applications can also depend on other types of resources, such as other applications, operating system services, disks, file systems, network adapters, IP addresses and communication stacks, to name just a few examples.

A resource is an abstraction of a hardware component (e.g., a network adapter) and/or a software component (e.g., a database server). The abstraction allows resources to be defined/undefined and allows for the manipulation of the resources and for relationships to be created. One resource may have a relationship with one or more other resources of the computing environment. The relationship may be, for instance, a dependency relationship, in which one resource is dependent on one or more other resources. For example, a payroll application may depend on a database server, and as such, the database server has to be ready before the payroll application can be brought online. Another type of a relationship may be a location relationship. For example, sometimes, resources that have a relationship with one another need to run on the same computing node. As another example, if an application, such as a database application, needs direct access to physical disks, then the application can only be run on those computing nodes having physical disks connected thereto.

The operation of bringing up a resource in order to enable it to function is known as onlining the resource. Conversely, the operation of shutting down a resource, sot hat it stops functioning is known as offlining the resource. A resource may have a state associated with it while it is running. The operation of saving the state is called checkpointing. A resource has a set of attributes associated therewith to support checkpointing. These attributes provide information about the capabilities of the resource, priority of the resource, whether the resource is checkpointable, as well as other types of information. A resource can be brought back to the same running state by making use of the state saved during checkpointing. This is known as restarting or recovering the resource. The manner in which a checkpoint is taken for a particular resource or a restart is performed for the resource, is resource dependent and known by the resource itself. As one example, the operating system provides support for the resource to checkpoint/restart itself efficiently.

Figure 2:
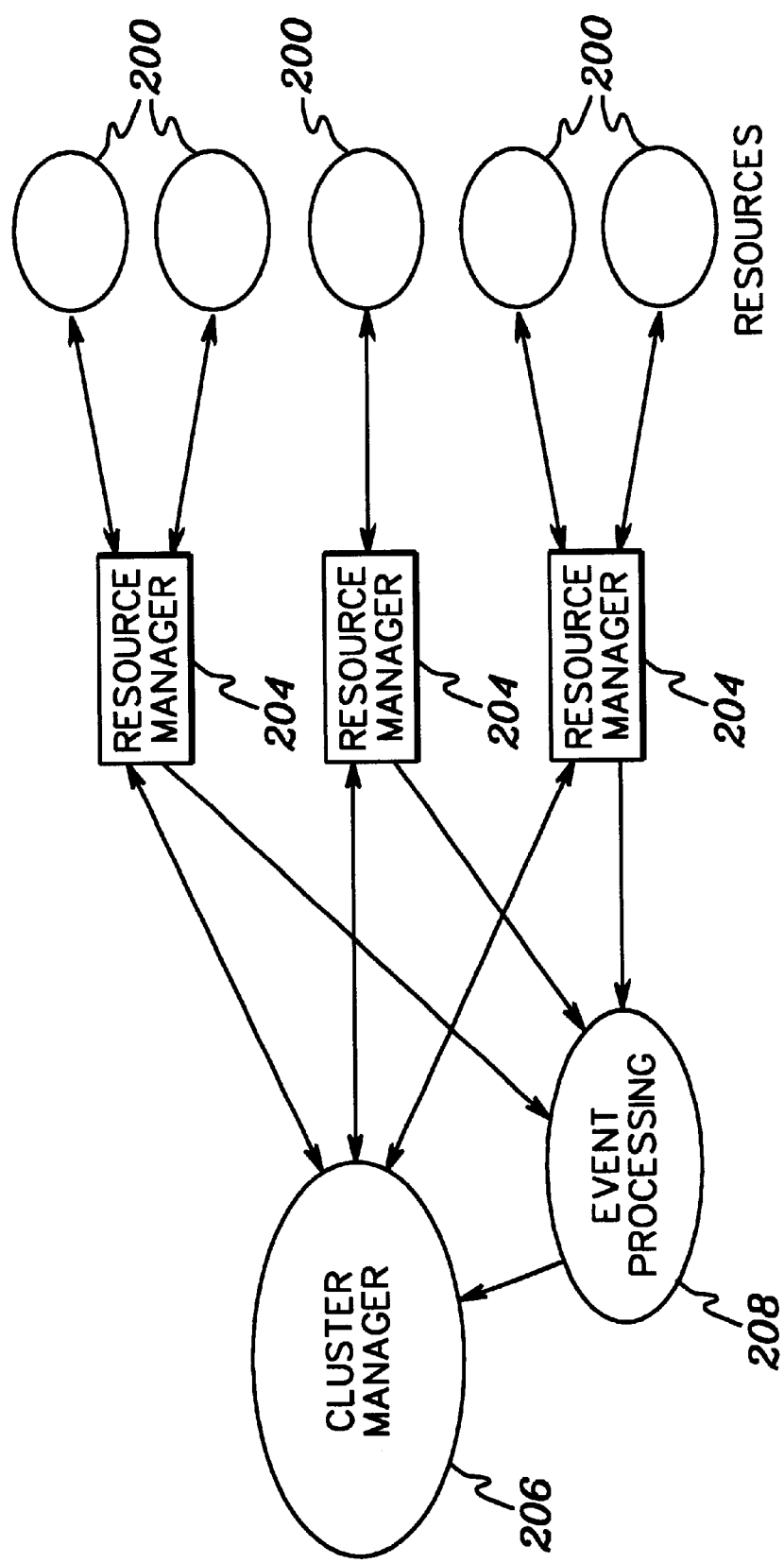
FIG. 2 depicts one embodiment of a logical organization of the computing environment of FIG. 1, in accordance with the principles of the present invention.

In order to invoke the checkpointing or restarting of a resource, the resource provides an invocation mechanism. This mechanism is very specific to the resource and requires knowledge about the resource. In accordance with the principles of the present invention, the invocation details for a particular resource is known by an entity, referred to as a resource manager, which is coupled to the resource. As depicted in FIG. 2, each resource 200 has associated therewith a resource manager 204. (It should be noted, however, that not all resources of a computing environment need a resource manager.) One resource manager can interact with one or more resources. Each resource manager 204 provides an interface to other entities that wish to inform the resource manager, for instance, that a resource is to be brought online or offline, a checkpoint is to be taken, or a resource is to be restarted. The resource manager is responsible for knowing the details of the resource and for invoking resource specific actions to make the resource checkpoint and/or restart itself. For example, a resource specific action to checkpoint a database is to have the database write a transaction log to a disk.

Additionally, the resource manager is responsible for monitoring the state of the resource. For example, when a resource fails (or goes offline), it is the responsibility of the resource manager to notify any entity that is interested in knowing about the state of the resource.

In accordance with the principles of the present invention, the resource managers, and in particular, the resource manager interfaces are coupled to at least one cluster manager 206. Cluster manager 206 is the entity which manages the resources in the cluster. It manages a resource by operating on its abstraction to query or change its state or other attributes. The cluster manager typically runs on one of the nodes in the cluster, but could run anywhere in the distributed system. One example of a cluster manager is the High-Availability Cluster Multiprocessing (HACMP) offered by International Business Machines Corporation.

The cluster manager has the task of maintaining the availability of the resources (i.e., having them online) and ensuring that the resources provide the desired quality of service. The cluster manager monitors the resources in the cluster using, for example, an event processing facility 208, coupled thereto.

Event processing facility 208 allows resource managers 204 to publish events (e.g., resource status)( that could be of interest to other entities in the distributed system. It then sends these events to entities that are interested in the events. The event processing facility decouples publishers from subscribers, so that the publishers need not know the subscribers. One example of an event processing facility is described in IBM PSSP Event Management Programming Guide and Reference, IBM Pub. No. SC23-3996-01, Second Edition, (August 1997), which is hereby incorporated herein by reference in its entirety.

The cluster manager has a global view of all the resources, their states and the relationships among them. Thus, a cluster manager arrives a certain decisions by utilizing information that may not be known to the resource. The cluster manager maintains a relationship tree (see FIG. 3, which is described below), which includes one or more of the resources of the computing environment and the constraints that interrelate them. (In another embodiment, there may be multiple relationship trees.) The cluster manager uses the global view, as well as policy or goal information supplied to it by the users of the cluster, to make decisions concerning the resources. For example, a policy might state that the cluster manager should try to online the resource on a different node from the node used when the resource failed.

In accordance with the principles of the present invention, the policy information, which may be stored on nodes or resources within the cluster or outside of the cluster, includes policies for checkpointing/restarting the resources. These policies may be associated with the relationships and/or events or interest (e.g., a periodic time pop) that affect the resources in the relationship tree. For example, a policy may be used to determine whether checkpointing is needed when a resource is added or removed from the relationship tree. That is, resources may be dynamically added or removed from the computing environment during run-time, and thus, dynamically added or removed from the tree. Whenever a resource is added or removed from the relationship tree, the checkpointing policy is exercised to determine whether checkpointing of a set of resources is needed.

As a specific example, consider a policy which states that all the resources in a relationship tree are to be checkpointed, if a resource with a lower priority (i.e., relative importance of running this resource when compared to other resources) is added to the relationship tree. When a resource with a lower priority is added to the relationship tree, the cluster manager exercises the policy and determines that all the resources in the relationship tree are to be checkpointed. An extension of this policy would be to propagate the priority of the highest priority resource down the relationship tree. Since a high priority resource can have a relationship with lower priority resources, the high priority is propagated down the tree, so that all the resources of the tree inherit the high priority during the running of the high priority resource. The policy could also specify the order tin which the resources get checkpointed and restarted.

Figure 3:
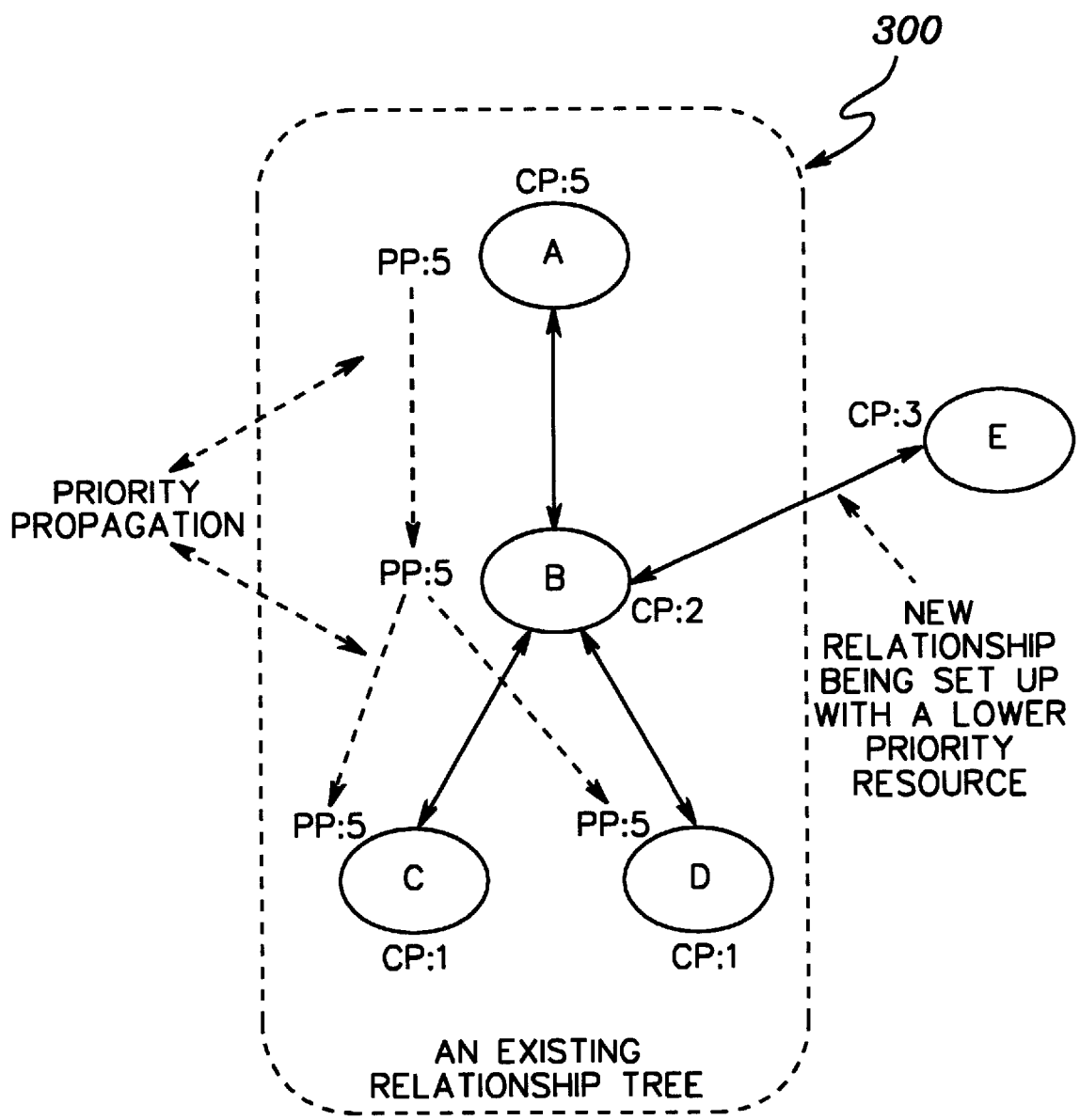
FIG. 3 depicts one embodiment of a relationship tree, in accordance with the principles of the present invention.

An illustration of the above example is depicted in FIG. 3. In FIG. 3, there is an existing relationship tree 300 with resources A, B, C and D. Resource A has a checkpoint priority (denoted as CP) of 5; Resource B has a priority of 2; and Resources C and D have a priority of 1. Since Resource A has a checkpoint priority of 5, all the resources in the relationship tree now have a propagated priority (PP) of 5, as per the policy. Consider adding a new relationship to the tree by adding another resource, Resource E, with a checkpoint priority of 3. Since this relationship contains a new resource with a lower priority, a checkpoint of all the resources in the existing tree is performed. The cluster manager initiates a checkpoint of Resources A, B, C and D using a resource manager interface for checkpointing, as described below. If there is a policy specifying the order in which the resources should be checkpointed, the cluster manager would then observe this policy. When the checkpointing is complete, the resource manager(s) of Resources A, B, C and D informs the cluster manager of completion by invoking a callback provided by the cluster manager. The new relationship is established once these resources have completed their checkpointing. If Resource E causes the system to crash, then a restart of Resources A, B, C and D is initiated. Again, there may be a policy associated with the order in which the resources are restarted.

Figure 4:
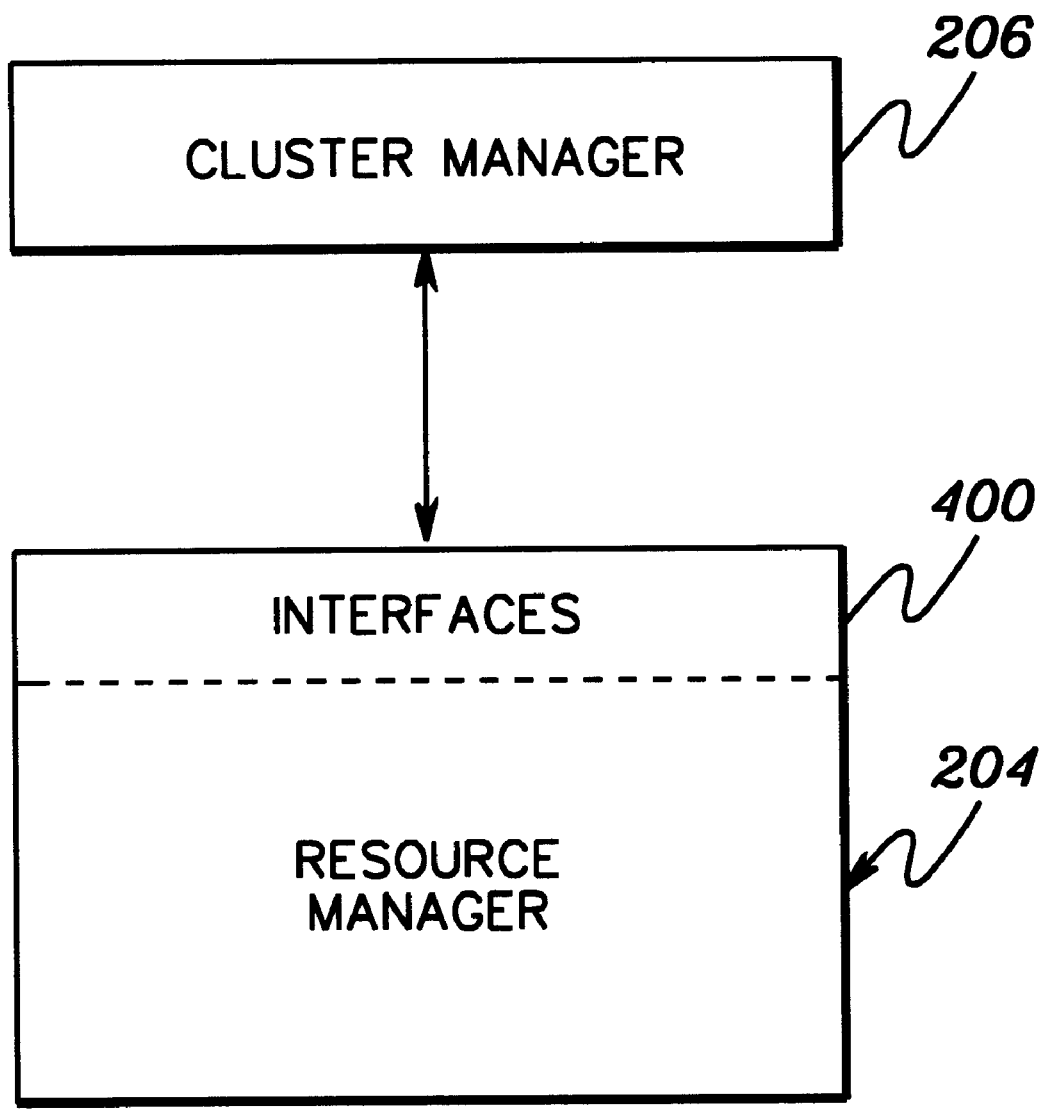
FIG. 4 depicts one embodiment of interfaces of a resource manager of FIG. 2, in accordance with the principles of the present invention.

When the cluster manager determines that an action is to be taken by a resource, the cluster manager informs the resource manager corresponding to that resource of the action to be performed. In accordance with the principles of the present invention, the cluster manager informs the resource manager via interfaces 400 (FIG. 4) provided by the resource manager. Interfaces 400 are, for example, application programing interfaces (APIs) called by entities within the computing environment, such as cluster manager 206. When an API is called, the resource manager takes the appropriate action and conveys the result of the action back to the caller through a callback mechanism or by posting an event to an event processing facility 208 (FIG. 2). The event processing facility would then inform the caller of the API about the status of the call.

In accordance with the principles of the present invention, various API calls can be made by the cluster manager, for instance. Examples of some of the API calls are described below.

As one example, an API call can be made to initiate a checkpoint. Specifically, this call informs the resource manager corresponding to the identified resource to initiate a checkpoint of the resource. This API call has, for instance, the following syntax: CheckpointResource(ResourceId, CheckPointKey). ResourceId is a unique identifier of the resource to be checkpointed, and CheckpointKey (e.g., a numeric value, an alphanumeric value or an alpha value) is an identifier that identifies the checkpoint. The key has semantic meaning to the entity making use of the resource manager interface. Over time, a resource may have multiple keys associated therewith. Thus, if a restart of the resource is needed, any one of the keys can be selected.

Upon receiving the CheckpointResource call, the resource manager initiates resource specific actions, to be performed by the resource, to checkpoint the resource. It uses the checkpoint key to keep track of this checkpoint. If the CheckPointKey is not specified, the resource manager uses a default key. When the checkpoint has been successfully completed, the resource manager invokes the registered callback or posts an event to the event processing facility informing the caller that the checkpointing has been completed. In case of an error, the resource manager notifies the caller in a similar way.

Another example of an API call used in conjunction with the present invention is RestartResource(ResourceId, CheckPointKey). RestartResource is used to inform the resource manager to initiate resource specific actions, to be performed by the resource, to restart the resource. The resource, identified by ResourceId, is restarted at the specified checkpoint designated by CheckPointKey. In particular, the saved state associated with that checkpoint key is used to restart the resource. If the checkpoint key is not specified, then the resource manager uses the default checkpoint key. The results of the restart are forwarded to the caller in a similar manner as the results of CheckpointResource.

A further example of an API call relevant to the present invention is CleanupCheckpoint (ResourceId, CheckPointKey). Checkpoints accumulate over a period of time and thus, are garbage collected in order to efficiently manage system resources, such as system memory. The CleanupCheckpoint call informs the resource manager associated with the resource identified by ResourceId to clean up the checkpoint information for the specified key. This may require the resource manager to invoke certain resource specific actions to be performed by the resources.

Further details regarding the taking of a checkpoint and restarting a resource in accordance with the principles of the present invention, are described below. In particular, one embodiment of taking a checkpoint is described in detail with reference to FIG. 5 and one embodiment for restarting a resource is described with reference to FIG. 6.

Figure 5:
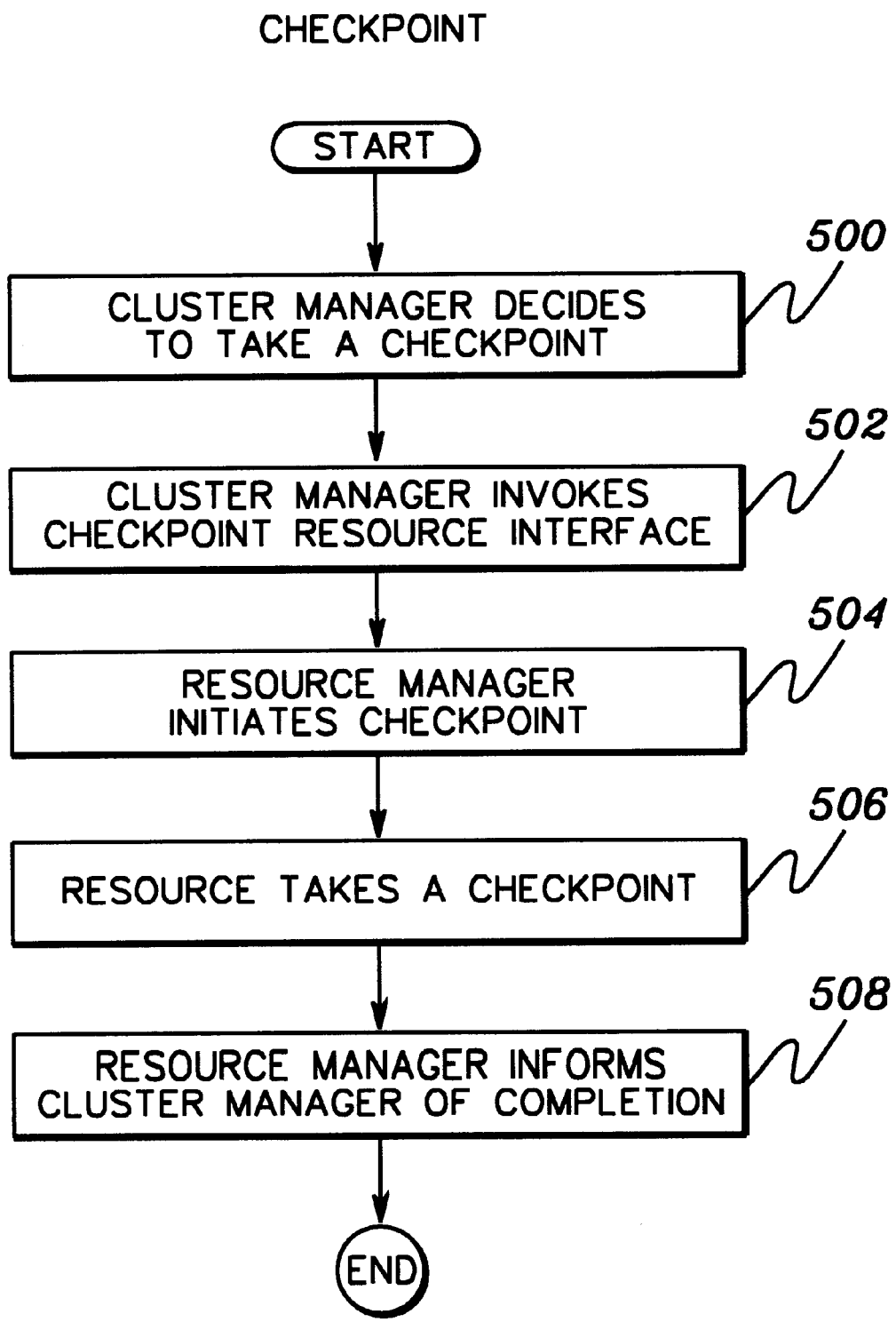
FIG. 5 depicts one embodiment of the logic associated with checkpointing a resource, in accordance with the principles of the present invention.
Figure 6:
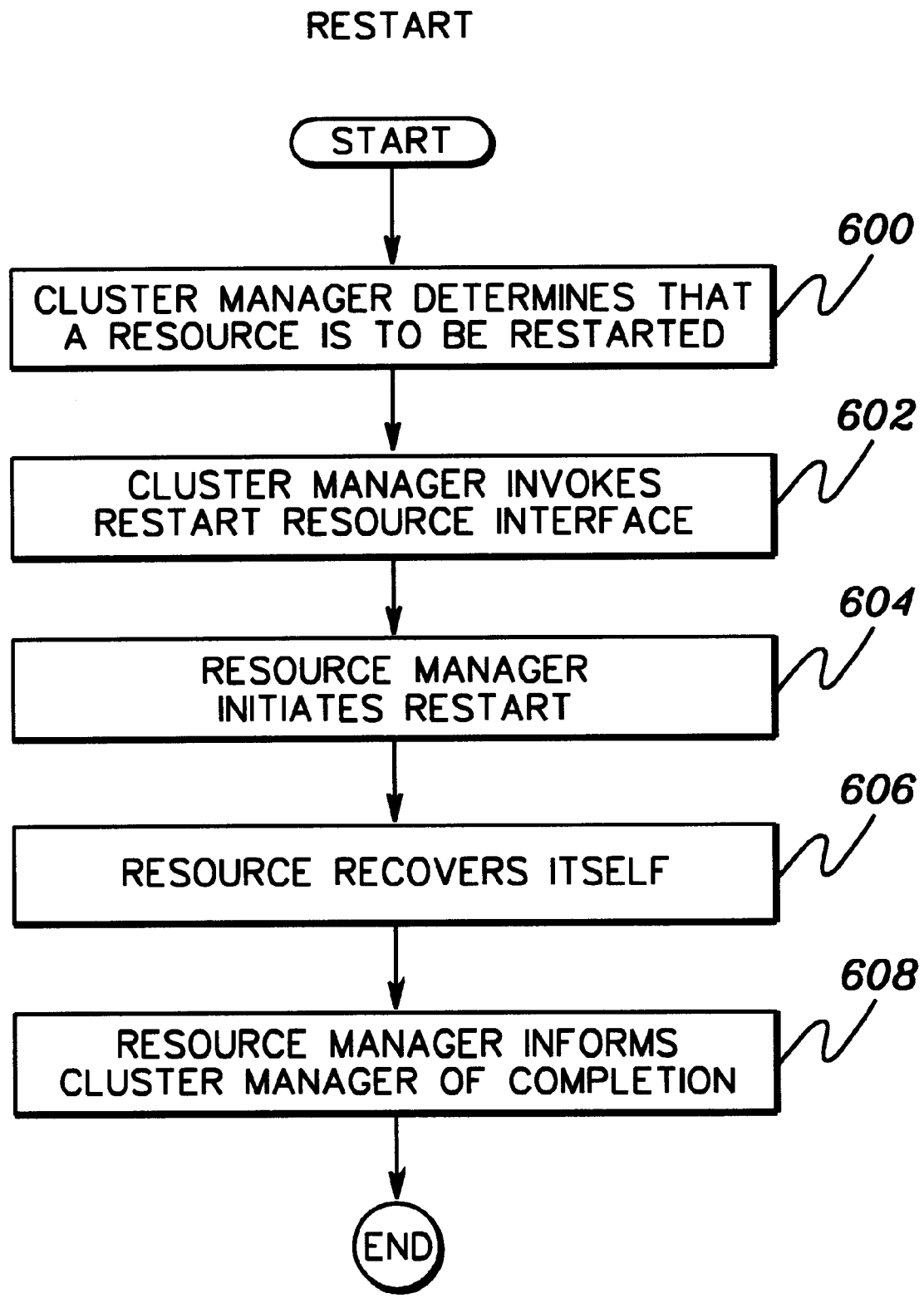
FIG. 6 depicts one embodiment of the logic associated with restarting a resource, in accordance with the principles of the present invention.

Referring to FIG. 5, initially, the cluster manager determines that a checkpoint is to be taken for one or more resources of the computing environment, STEP 500. This determination is made based on consultation with the checkpoint policy and/or based on resource dependency, as examples.

Subsequent to the cluster manager determining that a checkpoint is to be taken for a resource, the cluster manager invokes the checkpoint interface of the resource manager corresponding to that resource, STEP 502. The interface is invoked via, for instance, the CheckpointResource API. With the API call, the cluster manager provides the ResourceId, as well as the CheckPointKey. For example, if a checkpoint is to be taken of a resource (such as a database system) having a resource identity of A, then a ResourceId of A is passed with the call. Further, if Resource A is running at time t1, then the cluster manager provides a key of $K_{t1}$.

When the resource manager receives the CheckpointResource call, it initiates a checkpoint for the resource identified by the resource id. STEP 504. In particular, the resource manager initiates resource specific actions necessary to initiate the checkpoint of the resource. As one example, the resource manager may initiate the copying of a file to a mirror and remember the key associated with the checkpoint. (File mirroring is offered as only one example. There are many instances in which checkpointing is performed, and the actions taken in those instances are dependent on what needs to be accomplished.)

Thereafter, the resource takes its checkpoint, STEP 506. The manner in which this is accomplished is specific to the resource and need not be known by the cluster manager.

After the resource takes the checkpoint, the resource manager informs the cluster manager of completion. STEP 508. This is accomplished by invoking the registered callback or posting an event, as examples.

The above procedure is performed for each checkpoint that is to be taken. Although in the above embodiment, only one resource is represented by the API call, in other embodiments more than one resource id and/or more than one key id may be included in the call, thereby enabling one call to initiate checkpointing of a plurality of resources.

After a checkpoint is taken of a resource, that checkpoint can be used to restore the resource should the resource or the system fail. For example, if Resource A crashed at a time t2, then the checkpointed state of the resource at time t1 is used to recover the resource. This is described in further detail with reference to FIG. 6.

Initially, the cluster manager determines that a resource is to be restarted, STEP 600. For example, the cluster manager either detects or is informed that a resource has failed, and thus, determines that it needs to be restarted. The cluster manager may consult its policy to ensure proper invocation of the restart. Subsequently, the cluster manager invokes the restart interface of the resource manager corresponding to the resource to be restarted, STEP 602. As one example, the RestartResource API is used, which includes the resource id of the resource to be restarted and the checkpoint key identifying the checkpoint to be used for the restart. The checkpoint key is selected from one or more keys associated with the resource.

After the resource manager receives the RestartResource call, the resource manager initiates the restart for the resource, STEP 604. The manner in which this is accomplished is specific to the resource. For example, continuing with the one file mirroring example, the resource manager initiates the bringing back of the mirror copy associated with the specified key.

Thereafter, the resource recovers itself via resource specific actions, STEP 606. Once the restart is complete, the resource manager informs the cluster manager of completion using, for example, a registered callback or by posting an event, STEP 608.

Similar to checkpointing, in other embodiments, more than one resource may be represented by the API call by providing multiple resource ids and one or more keys.

In a further aspect of the present invention, the state of a distributed system (e.g., a homogeneous or heterogeneous system) can be checkpointed by checkpointing a subset or all of the resources in the system by using one or more sets of keys. Consider an example of a cluster having Resources A, B and C running in it. The state of the cluster can be considered as the combined state of the Resources A, B and C. The resources are checkpointed using a key set K1={$K_A$, $K_B$, $K_C$}, which corresponds to the resources at a time t1. Later, at a time t2, if the cluster state is to be restored to the state at time t1, Resources A, B and C are restarted with the key set K1. In particular, Resources A, B and C are restarted with keys $K_A$, $K_B$ and $K_C$, respectively.

Figure 7:
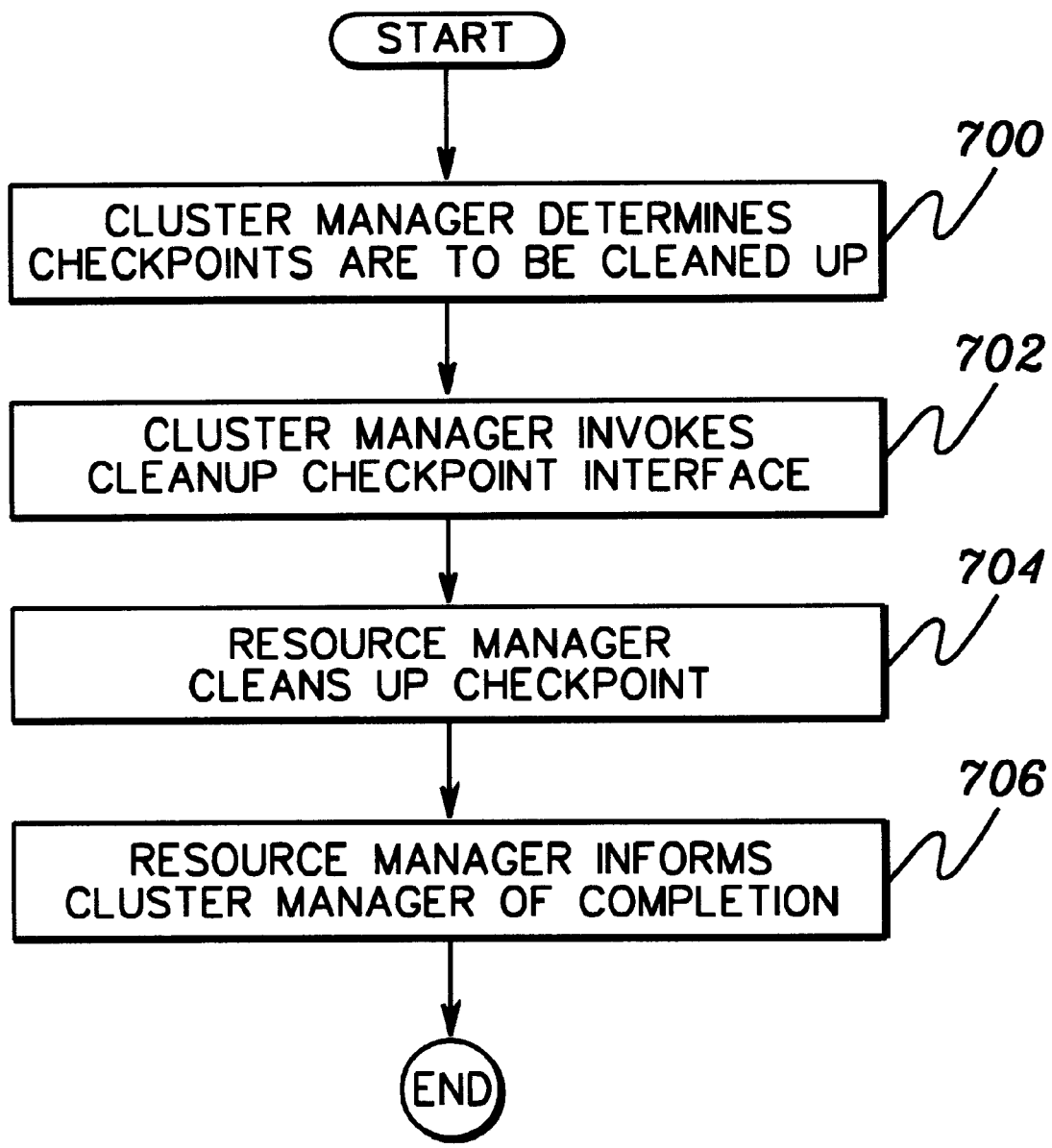
FIG. 7 depicts one embodiment of the logic associated with cleaning up checkpoint information, in accordance with the principles of the present invention.

As the checkpoints accumulate, they take up system resources, such as system memory. Thus a garbage collection process is invoked periodically by the cluster manager. In particular, the cluster manager monitors the accumulation (or is informed that garbage collection is to take place) and makes a determination, based on its policy, that the checkpoints are to be cleaned up, STEP 700 (FIG. 7).

After this determination is made, the cluster manager invokes the CleanupCheckpoint interface of the resource manager associated with the resource id passed with the call, STEP 702. The resource manager then cleans up the checkpoint information for the specified key, STEP 704. This may require the resource manager to perform certain resource specific actions. As one example, in the context of mirroring, the resource manager initiates deletion of the mirrored copy identified by the key.

When the cleanup is complete, the resource manager notifies the cluster manager of completion, STEP 706.

As with the other flows, in another embodiment, multiple resource ids and/or checkpoint keys may be presented in a single API call.

As described in detail above, the present invention provides capabilities for managing the checkpointing/restarting or resources of a computing environment. In one example the computing environment is a clustered environment, which is, for instance, a high-bandwidth connected set of servers that can be managed from a single point and appears as a single resource to end users, system administrators, and other clients.

In accordance with the principles of the present invention, an entity (e.g., a cluster manager), other than the entity (e.g., a resource) to be checkpointed/restarted, makes the decision to checkpoint/restart. The deciding entity has knowledge of the dynamic resource relationship information of resources and of policies that are associated with the checkpointing and restarting of the resources. The policies may be a part of the cluster manager or may be defined by the user. The policies can be enforced at the discretion of the user. Dynamic resource relationship information is used to checkpoint and restart resources in a cluster.

Resources are managed by entities known as resource managers. The resource managers provide interfaces that can be used to checkpoint and restart resources that are running in the computing environment. Each resource manager is, for example, a process independent of the resource, which is running in the cluster (although, in some cases, a resource can be its own resource manager). In some cases, the resource manager is outside the cluster, but still manages the resources in the cluster. The resource manager understands the details of how the resources associated therewith can be checkpointed and restarted. It maintains one or more keys, where each key is associated with a particular checkpoint.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing the checkpointing of resources of a computing environment, said method comprising:

determining, by a first entity of said computing environment, that a checkpoint of a resource of said computing environment is to be taken;

informing a second entity of the computing environment of the determination to checkpoint said resource, wherein said informing comprises invoking, by said first entity, an interface of said second entity indicative of said determination to take a checkpoint, and wherein said invoking comprises providing an identifier of said resource to be checkpointed; and initiating the taking of said checkpoint of said resource by the second entity.

2. The method of claim 1, wherein said invoking further comprises providing an identifier of the checkpoint.

3. The method of claim 1, further comprising informing said first entity, by said second entity, that the taking of the checkpoint is complete.

4. The method of claim 1, further comprising using said checkpoint to restart said resource.

5. A method of managing the checkpointing of resources of a computing environment, said method comprising:

determining, by a first entity of said computing environment, that a checkpoint of a resource of said computing environment is to be taken;

initiating the taking of said checkpoint of said resource by a second entity of said computing environment;

determining, by said first entity, that a restart is to take place; and using said checkpoint to restart said resource.

6. The method of claim 5, further comprising informing said second entity of the determination to restart said resource.

7. The method of claim 6, wherein said informing comprises invoking, by said first entity, an interface of said second entity indicative of said determination to restart.

8. A method of managing the checkpointing of resources of a computer environment, said method comprising:

determining, by a first entity of said computing environment, that a checkpoint of a resource of said computing environment is to be taken;

initiating the taking of said checkpoint of said resource by a second entity of said computing environment;

using said checkpoint to restart a resource; and informing said first entity, by said second entity, that the restart is complete.

9. The method of claim 8, wherein said initiating comprises initiating the taking of a plurality of checkpoints of a plurality of resources by at least one second entity.

10. The method of claim 9, wherein one or more resources of said plurality of resources have a priority associated therewith, and wherein said priority is usable during at least one of said determining and said initiating.

11. A method of managing the checkpointing of resources of a computing environment, said method comprising:

determining, by a first entity of said computing environment, that a checkpoint of a resource of said computing environment is to be taken;

initiating the taking of a plurality of checkpoints of a plurality of resources by at least one second entity of said computing environment; and using at least one set of checkpoint keys in checkpointing said plurality of resources.

12. The method of claim 11, further comprising using one or more sets of said at least one set of checkpoint keys to restart one or more resources of said plurality of resources.

13. A method of managing the checkpointing of resources of a computing environment, said method comprising:

determining, by a first entity of said computing environment, that a checkpoint of a resource of said computing environment is to be taken; and initiating the taking of a plurality of checkpoints of a plurality of resources by at least one second entity of said computing environment, and wherein at least one resource of said plurality of resources is executing on a computing node of said computing environment having a first operating system, and at least one other resource of said plurality of resources is executing on another computing node of said computing environment having a second operating system, which is different from said first operating system.

14. The method of claim 13, wherein said determining comprises using policy information in determining that said checkpoint is to be taken.

15. A method of managing the checkpointing of resources of a computing environment, said method comprising:

determining, by a first entity of said computing environment, that a checkpoint of a resource of said computing environment is to be taken, wherein said determining comprises using policy information in determining that said checkpoint is to be taken, and wherein said policy information includes a policy that a checkpoint is to be taken of any resources affected by adding or removing one or more resources from said computing environment; and initiating the taking of said checkpoint of said resource by a second entity of said computing environment.

16. A method of managing the checkpointing of resources of a computing environment, said method comprising:

determining, by a first entity of said computing environment, that a checkpoint of a resource of said computing environment is to be taken; and initiating the taking of said checkpoint of said resource by a second entity of said computing environment, wherein said resource has associated therewith an indicator specifying that said resource is checkpointable.

17. The method of claim 16, wherein said determining comprises using resource relationships in determining that said checkpoint is to be taken.

18. The method of claim 16, further comprising invoking, by said first entity, an interface of said second entity to clean up any unwanted checkpoint information.

19. The method of claim 18, wherein said invoking comprises providing at least one checkpoint key identifying the checkpoint information to be cleaned up.

20. The method of claim 16, wherein said second entity comprises one of said resource and a resource manager coupled to said resource and said first entity.

21. The method of claim 16, wherein said computing environment is a clustered environment.

22. A method of managing the checkpointing of resources of a computing environment, said method comprising:

determining, by a first entity of said computing environment, that a checkpoint of a resource of said computing environment is to be taken; and initiating the taking of said checkpoint of said resource by a second entity of said computing environment, wherein said computing environment is a distributed heterogeneous computing environment.

23. The method of claim 22, wherein said resource has a plurality of checkpoints associated therewith, and further comprising selecting one of said plurality of checkpoints to be used in restarting said resource.

24. A method of managing the restarting of resources of a computing environment, said method comprising:

determining, by a first entity of said computing environment, that a resource of said computing environment is to be restarted;

informing a second entity of said computing environment of the determination to restart said resource, wherein said informing comprises invoking, by said firs entity, an interface of said second entity indicative of said determination to restart, and wherein said invoking comprises providing a checkpoint key to said second entity identifying the checkpoint to be used during restart; and initiating the restarting of said resource by the second entity of said computing environment.

25. The method of claim 24, further comprising selecting said checkpoint key from one or more checkpoint keys associated with said resource.

26. The method of claim 24, wherein said initiating comprises initiating the restarting of a plurality of resources of said computing environment.

27. The method of claim 26, further comprising using at least one set of checkpoint keys to restart said plurality of resources.

28. A system of managing the checkpointing of resources of a computing environment, said system comprising:

a first entity of said computing environment adapted to determine that a checkpoint of a resource of said computing environment is to be taken;

means for informing a second entity of said computing environment of the determination to checkpoint said resource, wherein said means for informing comprises said first entity being adapted to invoke an interface of said second entity indicative of said determination to take a checkpoint, and wherein said first entity provides to said interface an identifier of said resource to be checkpointed; and the second entity of said computing environment adapted to initiate the taking of said checkpoint of said resource.

29. The system of claim 28, wherein said first entity provides to said interface an identifier of the checkpoint.

30. The system of claim 28, wherein said second entity is further adapted to inform said first entity that the taking of the checkpoint is complete.

31. The system of claim 28, further comprising means for using said checkpoint to restart said resource.

32. The system of claim 31, wherein said first entity is further adapted to determine that said restart is to take place.

33. The system of claim 32, further comprising means for informing said second entity of the determination to restart said resource.

34. The system of claim 33, wherein said means for informing comprises said first entity being adapted to invoke an interface of said second entity indicative of said determination to restart.

35. The system of claim 31, wherein said second entity is further adapted to inform said first entity that the restart is complete.

36. The system of claim 28, further comprising means for initiating the taking of a plurality of checkpoints of a plurality of resources by at least one second entity.

37. The system of claim 36, wherein at least one resource of said plurality of resources is executing on a computing mode of said computing environment having a first operating system, and at least one other resource of said plurality of resources is executing on another computing node of said computing environment having a second operating system, which is different from said first operating system.

38. The system of claim 36, wherein one or more resources of said plurality of resources have a priority associated therewith, and wherein said priority is usable during at least one of the determining and the initiating.

39. The system of claim 28, wherein said first entity uses policy information in determining that said checkpoint is to be taken.

40. The system of claim 39, wherein said policy information includes a policy that a checkpoint is to be taken of any resources affected by adding or removing one or more resources from said computing environment.

41. The system of claim 28, wherein said first entity uses resource relationships in determining that said checkpoint is to be taken.

42. The system of claim 28, wherein said resource has a plurality of checkpoints associated therewith, and further comprising means for selecting one of said plurality of checkpoints to be used in restarting said resource.

43. A system of managing the checkpointing of resources of a computing environment, said system comprising:

a first entity of said computing environment adapted to determine that a checkpoint of a resource of said computing environment is to be taken;

at least one second entity of said computing environment adapted to initiate the taking of a plurality of checkpoints of a plurality of resources; and means for using at least one set of checkpoint keys in checkpointing said plurality of resources.

44. The system of claim 43, further comprising means for using one or more sets of said at least one set of checkpoint keys to restart one or more resources of said plurality of resources.

45. A system of managing the checkpointing of resources of a computing environment, said system comprising:

a first entity of said computing environment adapted to determine that a checkpoint of a resource of said computing environment is to be taken; and a second entity of said computing environment adapted to initiate the taking of said checkpoint of said resource, wherein said resource has associated therewith an indicator specifying that said resource is checkpointable.

46. The system of claim 45, wherein said first entity is further adapted to invoke an interface of said second entity to clean up any unwanted checkpoint information.

47. The system of claim 46, wherein said first entity provides to said interface at least one checkpoint key identifying the checkpoint information to be cleaned up.

48. The system of claim 45, wherein said second entity comprises one of said resource and a resource manager coupled to said resource and said first entity.

49. A system of managing the checkpointing of resources of a computing environment, said system comprising:

a first entity of said computing environment adapted to determine that a checkpoint of a resource of said computing environment is to be taken; and a second entity of said computing environment adapted to initiate the taking of said checkpoint of said resource, wherein said computing environment is at least one of a clustered environment and a distributed heterogeneous computing environment.

50. A system of managing the restarting of resources of a computing environment, said system comprising:

a first entity of said computing environment being adapted to determine that a resource of said computing environment is to be restarted;

means for informing a second entity of said computing environment of the determination to restart said resource, wherein said means for informing comprises means for invoking, by said first entity, an interface of said second entity indicative of said determination to restart, and wherein said means for invoking comprises means for providing a checkpoint key to said second entity identifying the checkpoint to be used during restart; and the second entity of said computing environment being adapted to initiate the restarting of said resource.

51. The system of claim 50, further comprising means for selecting said checkpoint key from one or more checkpoint keys associated with said resource.

52. The system of claim 50, further comprising means for initiating the restarting of a plurality of resources of said computing environment by at least one second entity.

53. The system of claim 52, further comprising means for using at least one set of checkpoint keys to restart said plurality of resources.

54. A system of managing the checkpointing of resources of a computing environment, said system comprising:
- means for determining, by a first entity of said computing environment, that a checkpoint of a resource of said computing environment is to be taken;
- means for initiating the taking of said checkpoint of said resource by a second entity of said computing environment; and
- means for informing said second entity of a determination to restart said resource, said means for informing comprising means for invoking, by said first entity, an interface of said second entity indicative of said determination to restart.

55. The system of claim 54, further comprising means for informing said second entity of the determination to checkpoint said resource, said means for informing comprising means for invoking, by said first entity, an interface of said second entity indicative of said determination to take a checkpoint.

56. A system of managing the restarting of resources of a computing environment, said system comprising:
- means for determining, by a first entity of said computing environment, that a resource of said computing environment is to be restarted;
- means for informing a second entity of the computing environment of the determination to restart said resource, wherein said means for informing comprises means for invoking, by said first entity, an interface of said second entity indicative of said determination to restart, and wherein said means for invoking comprises means for providing a checkpoint key to said second entity identifying the checkpoint to be used during restart; and
- means for initiating the restarting of said resource by the second entity of said computing environment.

57. An article of manufacture, comprising:
- at least one computer usable medium having computer readable program code means embodied therein for causing the checkpointing of resources of a computing environment, the computer readable program code means in said article of manufacture comprising:
  - computer readable program code means for causing a computer to determine, by a first entity of said computing environment, that a checkpoint of a resource of said computing environment is to be taken; and
  - computer readable program code means for causing a computer to initiate the taking of a plurality of checkpoints of a plurality of resources by at least one second entity of said computing environment, and wherein at least one resource of said plurality of resources is executing on a computing node of said computing environment having a first operating system, and at least one other resource of said plurality of resources is executing on another computing node of said computing environment having a second operating system, which is different from said first operating system.

58. The article of manufacture of claim 57, further comprising computer readable program code means for causing a computer to inform at least one second entity of the determination to checkpoint said resource.

59. The article of manufacture of claim 58, wherein said computer readable program code means for causing a computer to inform comprises computer readable program code means for causing a computer to invoke, by said first entity, an interface of at least one second entity indicative of said determination to take a checkpoint.

60. The article of manufacture of claim 57, further comprising computer readable program code means for causing a computer to inform said first entity, by at least one second entity, that the taking of at least one checkpoint is complete.

61. The article of manufacture of claim 57, further comprising computer readable program code means for causing a computer to use at least one checkpoint to restart at least one resource.

62. The article of manufacture of claim 57, further comprising computer readable program code means for causing a computer to invoke, by said first entity, an interface of at least one second entity to clean up any unwanted checkpoint information.

63. An article of manufacture, comprising:
- at least one computer usable medium having computer readable program code means embodied therein for causing the checkpointing of resources of a computing environment, the computer readable program code means in said article of manufacture comprising:
  - computer readable program code means for causing a computer to determine, by a first entity of said computing environment, that a checkpoint of a resource of said computing environment is to be taken;
  - computer readable program code means for causing a computer to initiate the taking of said checkpoint of said resource by a second entity of said computing environment; and
  - computer readable program code means for causing a computer to inform said second entity of a determination to restart said resource.

64. The article of manufacture of claim 63, wherein said computer readable program code means for causing a computer to inform comprises computer readable program code means for causing a computer to invoke, by said first entity, an interface of said second entity indicative of said determination to restart.

65. The article of manufacture of claim 63, wherein said computer readable program code means for causing a computer to initiate comprises computer readable program code means for causing a computer to initiate the taking of a plurality of checkpoints of a plurality of resources by at least one second entity.

66. The article of manufacture of claim 65, further comprising computer readable program code means for causing a computer to use at least one set of checkpoint keys in checkpointing said plurality of resources.

67. The article of manufacture of claim 66, further comprising computer readable program code means for causing a computer to use one or more sets of said at least one set of checkpoint keys to restart one or more resources of said plurality of resources.

68. The article of manufacture of claim 65, wherein at least one resource of said plurality of resources is executing on a computing node of said computing environment having a first operating system, and at least one other resource of said plurality of resources is executing on another computing node of said computing environment having a second operating system, which is different from said first operating system.

69. At least one program storage device readable by a machine, tangibly embodying at least one program of instructions executable by the machine to perform a method of managing the restarting of resources of a computing environment, said method comprises:

determining, by a first entity of said computing environment, that a resource of said computing environment is to be restarted;

informing a second entity of the computing environment of the determination to restart said resource, wherein said informing comprises invoking, by said first entity, an interface of said second entity indicative of said determination to restart, and wherein said invoking comprises providing a checkpoint key to said second entity identifying the checkpoint to be used during restart; and initiating the restarting of said resource by the second entity of said computing environment.

* * * * *

UNITED STATES PATENT AND TRADEMARK OFFICE
CERTIFICATE OF CORRECTION

PATENT NO. : 6,594,779 B1
DATED : July 15, 2003
INVENTOR(S) : Chandra et al.

It is certified that error appears in the above-identified patent and that said Letters Patent is hereby corrected as shown below:

Column 4,
Line 18, delete "RE/6000" and insert -- RS/6000 --

Column 6,
Line 4, delete "(" before the word "that"
Line 58, delete the word "tin" and insert the word -- in --

Column 8,
Line 55, delete "." after the word "completion" and insert -- , --

Column 12,
Line 65, delete the word "firs" and insert the word -- first --

Column 13,
Line 52, delete the word "mode" and insert the word -- node --

Signed and Sealed this

Fourteenth Day of October, 2003

JAMES E. ROGAN
*Director of the United States Patent and Trademark Office*